United States Patent [19]
Miura

[11] Patent Number: 5,084,769
[45] Date of Patent: Jan. 28, 1992

[54] IMAGE PROCESSING APPARATUS

[75] Inventor: Kiyotaka Miura, Tokyo, Japan

[73] Assignee: Canon Kabushiki Kaisha, Tokyo, Japan

[21] Appl. No.: 607,857

[22] Filed: Oct. 31, 1990

Related U.S. Application Data

[63] Continuation of Ser. No. 363,064, Jun. 6, 1989, abandoned.

[30] Foreign Application Priority Data

Jun. 13, 1988 [JP] Japan .................................. 63-143523
Jun. 13, 1988 [JP] Japan .................................. 63-143524

[51] Int. Cl.$^5$ .............................................. H04N 1/40
[52] U.S. Cl. ..................................... 358/403; 358/453; 379/100
[58] Field of Search .................. 358/403, 453; 379/100

[56] References Cited

U.S. PATENT DOCUMENTS 4,264,808 4/1981 Owens .................................. 358/453

Primary Examiner—Howard W. Britton
Attorney, Agent, or Firm—Fitzpatrick, Cella, Harper & Scinto

[57] ABSTRACT

An image processing apparatus such as a facsimile comprises: a recognizing circuit to recognize special pattern information such as a mark in reception image data; a converter to convert the result of the recognition by the recognizing circuit into the index information corresponding to image information in the reception image data; and a memory to store the index information converted by the converter and the image information so as to correspond to one another. When the user at a remote location wants to obtain image data, the image data can be transmitted from the electronic file system without needing any operator of the file system.

104 Claims, 7 Drawing Sheets

| BLOCK | LOCATION | CONTENTS |
|-------|----------|----------|
| 1 | 1 | CATALOGUE |
|   | 2 | NEWSPAPER |
|   | 3 | PATENTS |
|   | 4 |  |
|   | 5 |  |
| 2 | 1 | COMPANY A |
|   | 2 | COMPANY B |
|   | 3 | COMPANY C |
|   | 4 | COMPANY D |

| BLOCK | LOCATION | CONTENTS |
|---|---|---|
| 1 | 1 | CATALOGUE |
|   | 2 | NEWSPAPER |
|   | 3 | PATENTS |
|   | 4 |   |
|   | 5 |   |
| 2 | 1 | COMPANY A |
|   | 2 | COMPANY B |
|   | 3 | COMPANY C |
|   | 4 | COMPANY D |

IMAGE PROCESSING APPARATUS

This application is a continuation of application Ser. No. 07/363,064 filed June 6, 1989, now abandoned.

BACKGROUND OF THE INVENTION

1. Field of the Invention

The present invention relates to an image processing apparatus having an image data file and having the communicating function.

2. Related Background Art

Hitherto, an electronic file system having the facsimile communicating function mainly transmits data from the electronic file system to a facsimile. However, in the case where the system can also receive data, after image data was received from a partner facsimile, the operator of the electronic file system needs to execute the operation to give the index information corresponding to the received image in order to register the image data as a file.

On the other hand, even in the case where image data was input from the reader of the electronic file system, a plurality of index information must be added for enabling other users or the like to refer to the image data.

Therefore, in the case of registering the image data as a file to the electronic file system the operator of the electronic file system needs to perform the operation to add a plurality of index information by using a keyboard or the like.

Hitherto, in an electronic file system having the facsimile communicating function, in the case where the user wants to obtain desired image data stored in the electronic file system, his request is previously informed to the operator of the electronic file system by a telephone or the like to thereby allow the desired image data to be transmitted to the facsimile by the search of the operator.

However, when the user desires the image data, the operator certainly needs to be present on the electronic file side. If the operator is absent, the user cannot obtain the desired information in a real-time manner.

SUMMARY OF THE INVENTION

The present invention is made to solve the above problems and it is an object of the invention to provide an image processing apparatus in which in the case where the user desires the image data, the image data is transmitted without the presence of the operator of the image processing apparatus.

The invention is made to solve the above problems and it is another object of the invention to provide an image processing apparatus in which index information and image information in the reception image data are registered and stored so as to correspond to one another.

DETAILED DESCRIPTION OF THE PREFERRED EMBODIMENT

A preferred embodiment according to the present invention will be described in detail hereinbelow with reference to the drawings.

Figure 1:
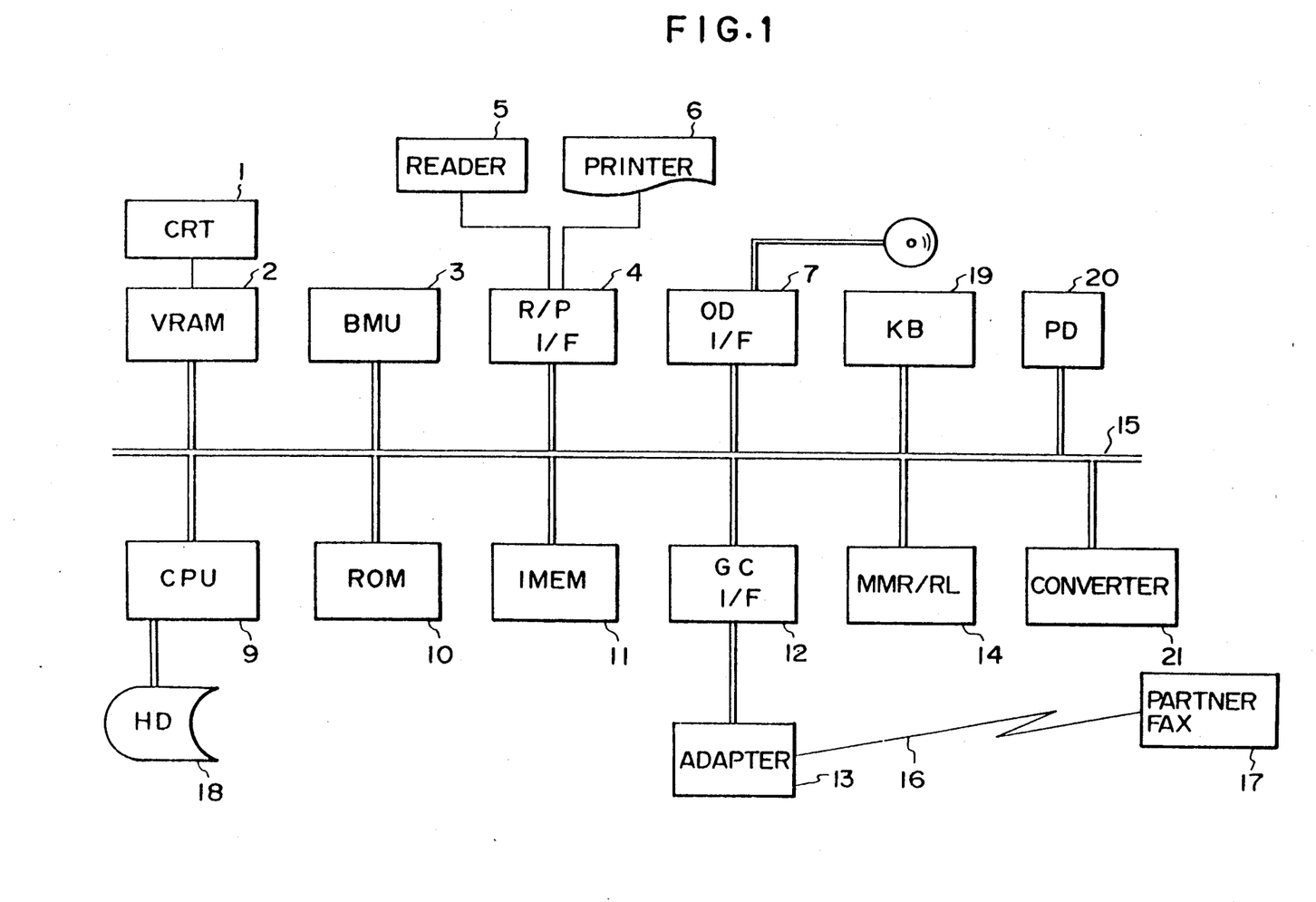
FIG. 1 is a block diagram of an electronic file system of an embodiment according to the present invention.

Description of schematic construction (FIG. 1)

FIG. 1 is a block diagram showing a construction of an electronic file system in the embodiment. Reference numeral 1 denotes a display (CRT) as a high resolution CRT display; 2 indicates a video RAM (VRAM) to display an image on the CRT 1; 3 a bit manipulation unit (BMU) to execute the bit operation of image data; 4 an interface (R/P I/F) of a printer 6 and a reader 5; 5 the reader; 6 the printer; 7 an interface (OD I/F) of an optical disk 8; and 8 the optical disk. A magneto-optical disk may be used in place of the optical disk 8. Reference numeral 9 denotes a CPU to perform the main control of the system; 10 is an ROM in which a processing procedure of the CPU 9, which will be explained hereinafter, is stored; 11 an image memory (IMEM); 12 a general communication interface (GC I/F) to perform the communication with the outside; 13 an adapter to connect data from a communication board to a telephone network 16; 14 a MMR/RL curcuit (Modified Modified READ/Run Length) to compress and expand image data; 15 an I/0 bus; 16 the telephone network; 17 a partner facsimile; 18 a hard disk; 19 a keyboard (KB) to input data such as an operation command and the like; and 20 a pointing device (PD) to indicate coordinates on the CRT 1.

Figure 2:
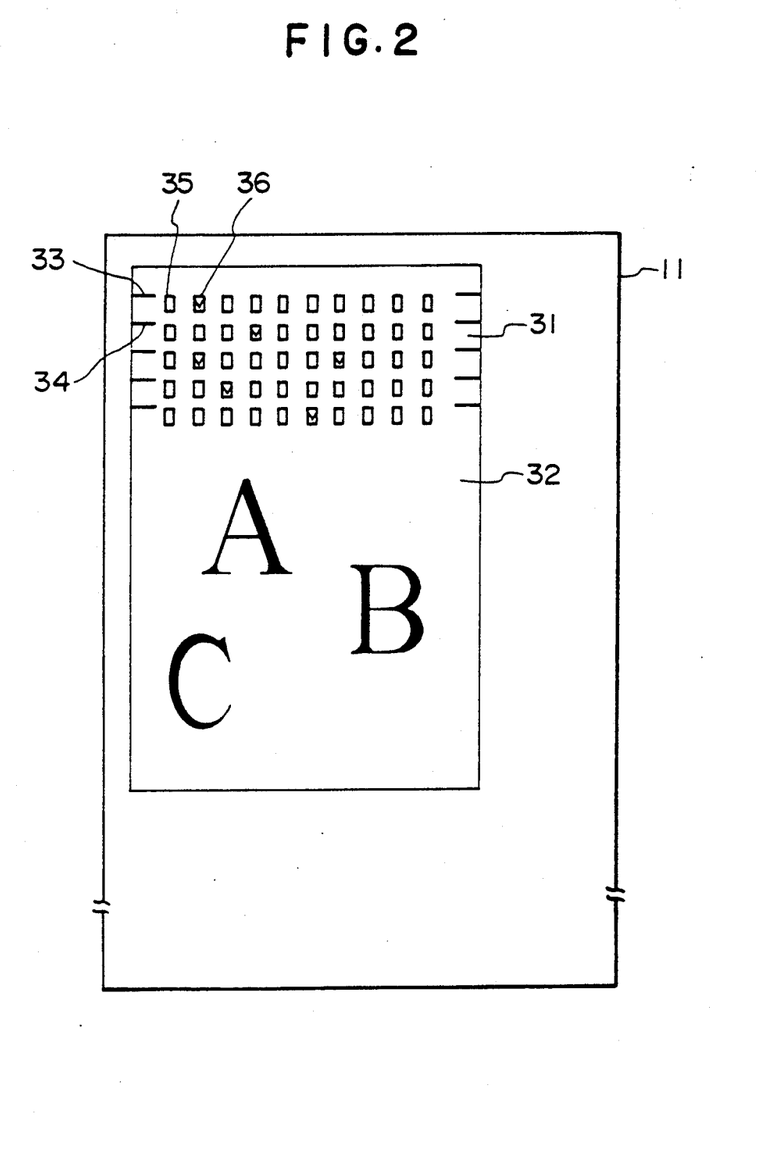
FIG. 2 is a diagram for explaining image data.
Figure 3:
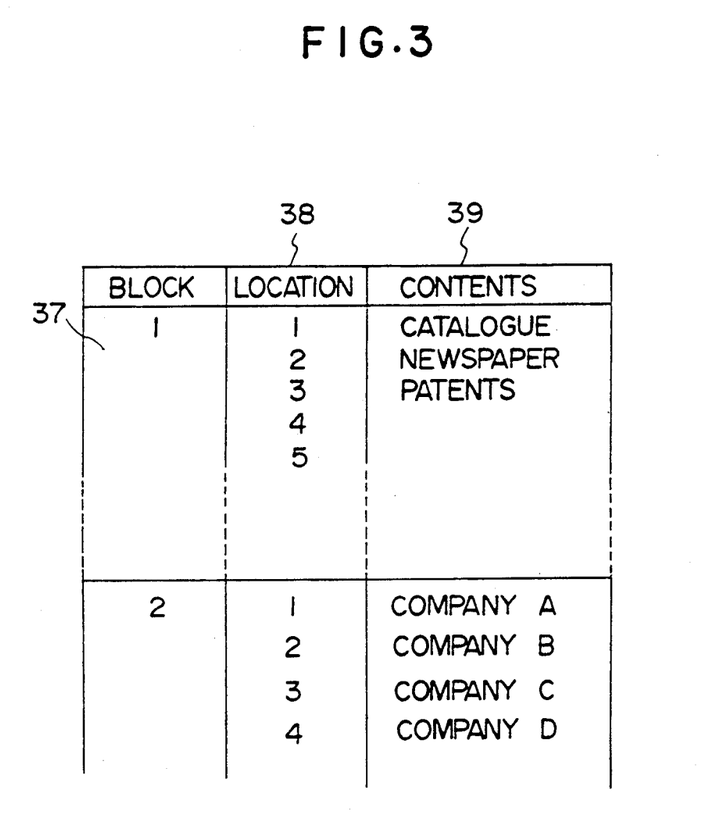
FIG. 3 is a diagram for explaining a table for converting marks into code data in the embodiment.
Figure 4:
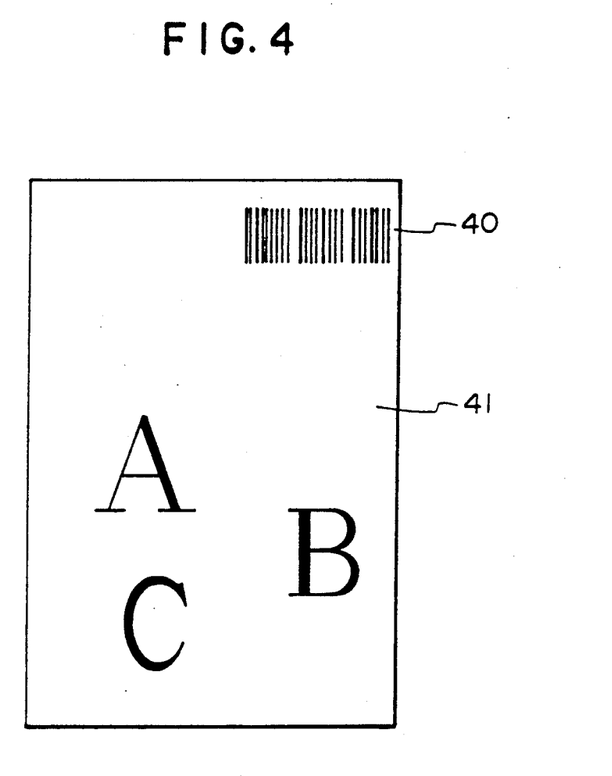
FIG. 4 is a diagram for explaining the image data using a bar code.

Description of the converter (FIGS. 2 to 4)

A converter 21 for recognizing a special area in image data in the embodiment and for converting into a plurality of index information corresponding to the image areas of the image data will now be described hereinbelow with reference to FIGS. 2 and 3.

As shown in FIG. 2, recognizing means in the embodiment uses the optical mark recognition in which a mark is written to a special area. In the diagram, reference numeral 31 denotes a special area of image data and 32 indicates an image area. Reference numerals 33 and 34 denote tags to recognize the positions of marks; 35 a position to be marked; and 36 a portion which was actually marked.

First, the converter 21 converts the special area 31 into the code data by the optical mark recognition. Next, on the basis of the converted code data, the conversion content corresponding to a block 37 and a location 38 in an index information table shown in FIG. 3 is extracted by only the amount of the code data. The conversion of the index information is finished. The index information table has previously been stored into the hard disk 18.

In the embodiment, the tags 33 and 34 and the mark 35 shown in FIG. 2 have been used as the recognizing means. However, what is called a bar code recognition in which the width of linear image is analyzed as shown in FIG. 4 can be also used. Reference numeral 40 in FIG. 4 denotes a bar code of the special area of the image data and 41 indicates an image area of the image data.

Figure 5:
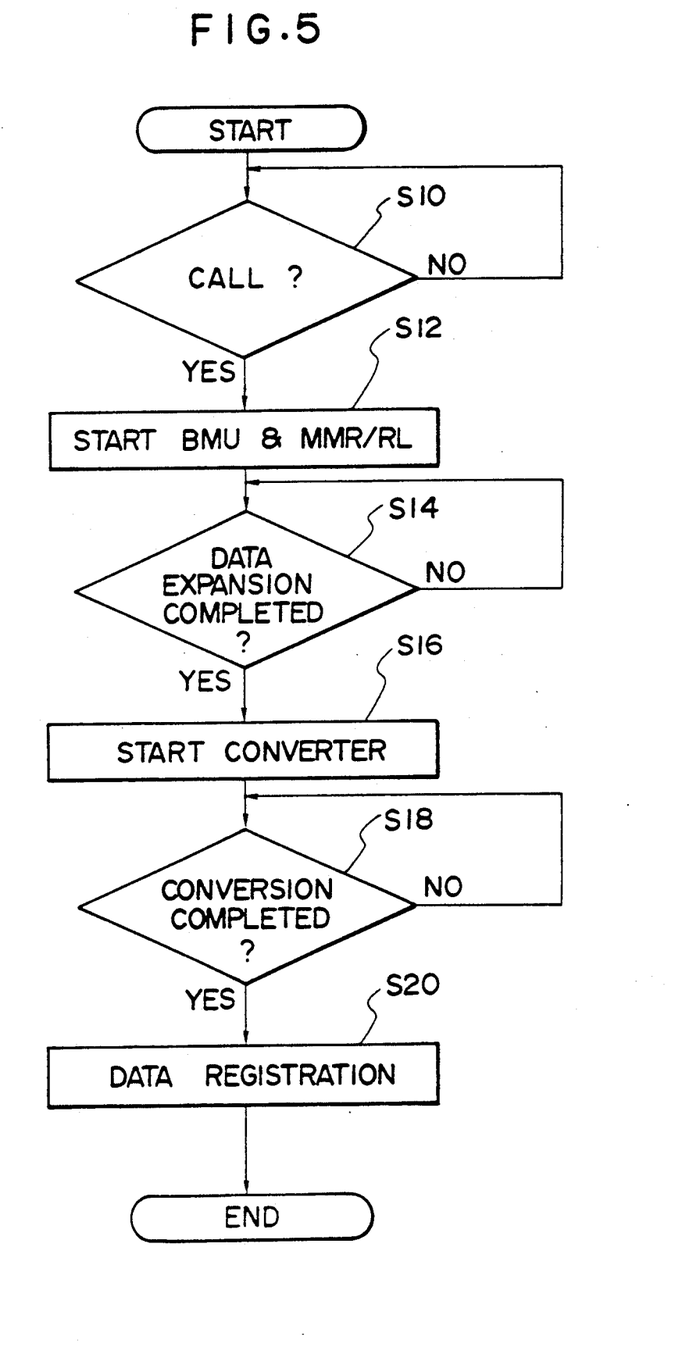
FIG. 5 is an operation flowchart in the embodiment.

Description of the operation (FIG. 5)

The operations to receive and register an image from a partner facsimile by the electronic file system in the embodiment will now be described hereinbelow with reference to a flowchart of FIG. 5.

First, in step S10, the CPU 9 shown in FIG. 1 is in the waiting mode of a terminating call. When an end of reception signal is transmitted from the general communication interface (GC I/F) 12, step S12 follows. When a terminating call is received from the partner facsimile 17 through the public telephone network 16 in the waiting mode of the CPU 9, the GC I/F 12 receives the data through the adapter 13. When an end signal of the data transmission is received from the partner facsimile 17, the connected line is disconnected and an end of reception signal is output to the CPU 9. in the next step S12, the BMU 3 is made operative to transmit the received data to the image memory (IMEM) 11 and the MMR/RL 14 is made operative to expand the received data. In step S14, a check is made to see if the expansion of the received data has been completed or not. In the GIII mode, since the facsimile transmission and reception data has been compressed by the MH method, it is expanded by using the MMR/RL 14 and is developed into the image memory 11. FIG. 2 shows the expanded data developed in the image memory 11.

When an end signal of the data expansion is received from the MMR/RL 14, the processing routine advances to step S16 and the converter 21 is made operative to convert the image data shown in FIG. 2 into the index information. In step S18, a check is made to see if an end signal of the conversion is received from the converter 21 or not. If YES in step S18, step S20 follows and a plurality of index information and images corresponding to the image data are written onto the optical disk 8 through the optical disk controller (OD I/F) 7. In this manner, the registration of the received image data and a plurality of index information corresponding to the image data is finished.

According to the embodiment, in the case where an image is registered and stored into the electronic file system and a key word is given as proper index information, these processes can be executed by merely transmitting the image data from the facsimile at a distant location without using the reader 5, keyboard 19, and the like of the electronic file system. On the other hand, the facsimile can be used as one of the registering and storing means of the electronic file system. If the index information to be registered has already existed on the optical disk, this fact may be also transmitted to the transmitting side. In such a case, it is sufficient to merely transmit the new index information to the electronic file system.

As described above, according to the invention, the index information and image information in the received image data can be registered and stored so as to correspond to one another without needing any operator.

Figure 6:
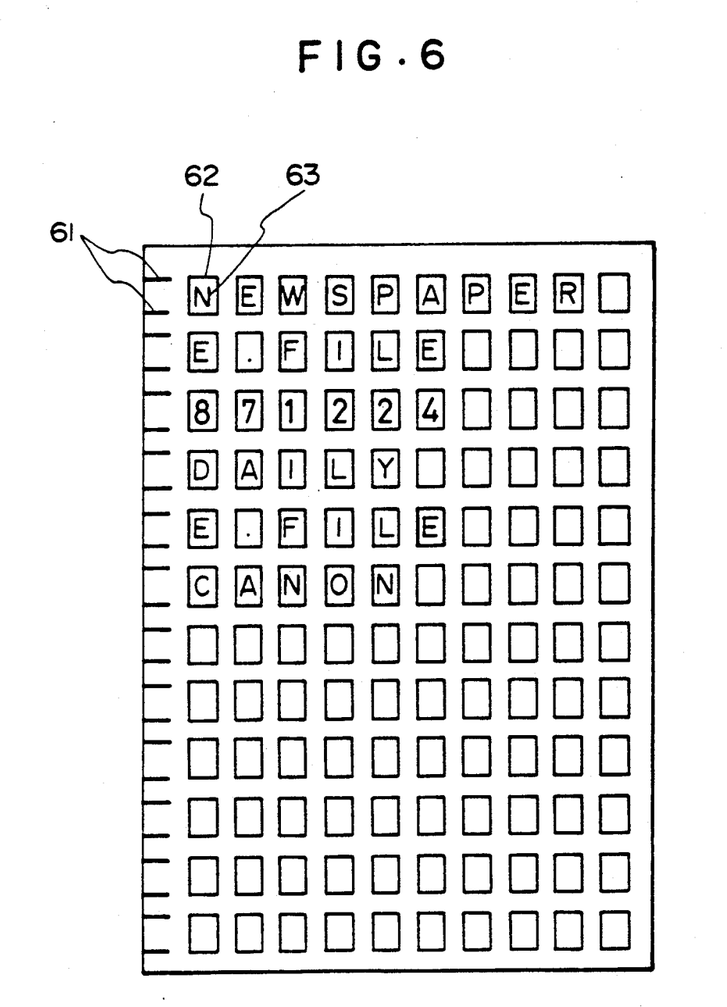
FIG. 6 is a diagram for explaining a received original.
Figure 7:
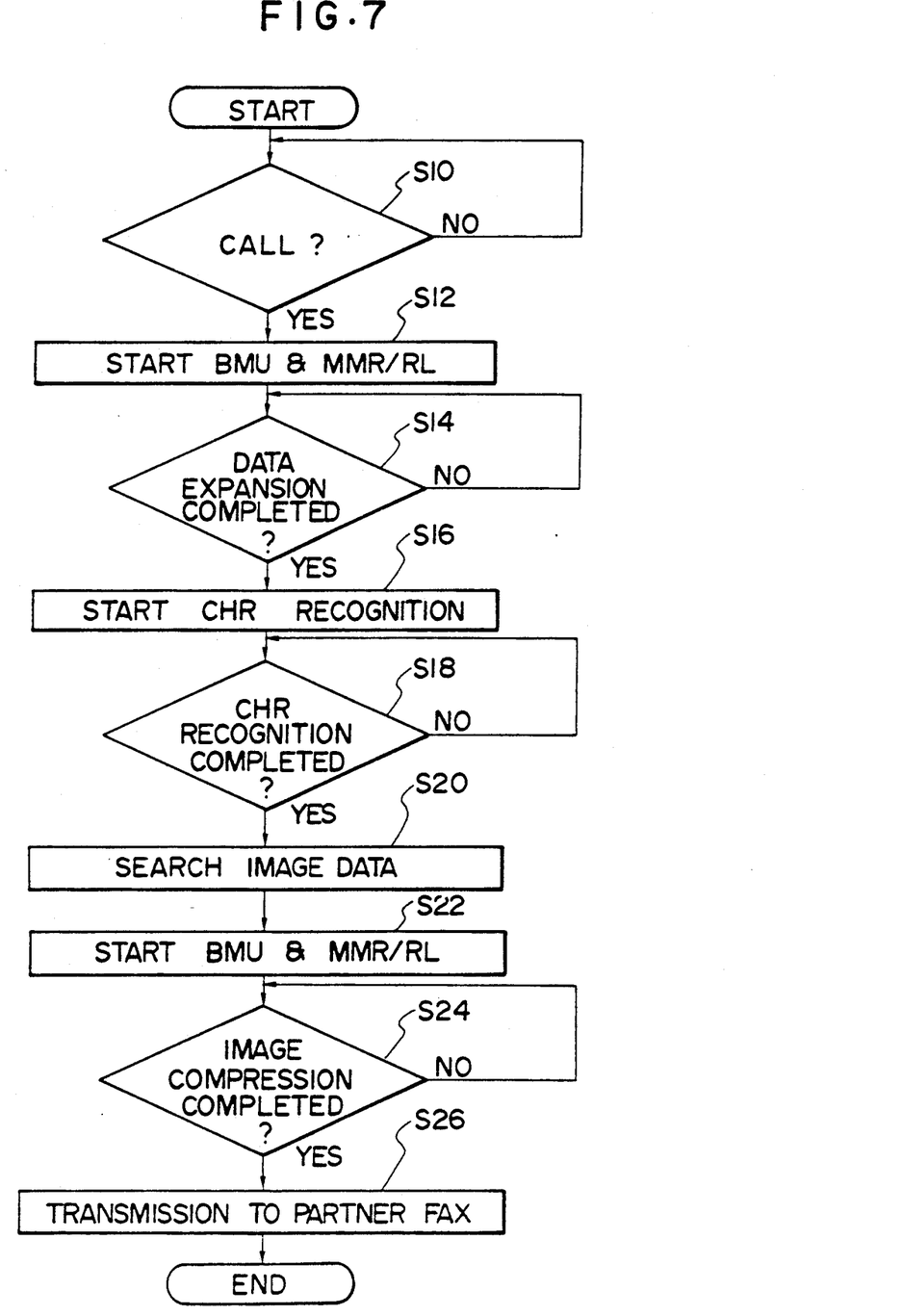
FIG. 7 is an operation flowchart showing a processing procedure.

Description of the processing procedure (FIGS. 6 and 7)

Next, FIG. 6 shows an example of an original which is transmitted to the electronic file system (image processing apparatus) in the case where the user wants to obtain image data in the embodiment. The index information which is necessary when the electronic file system searches the image data is written on the original.

As shown in the diagram, reference numeral 61 denotes tags for character recognition; 62 indicates a box into which it is necessary to write a character; and 63 represents index information written. The reception original in FIG. 6 is recognized as characters by the converter 21 and the result of the recognition is used as the index information of desired image data. In the embodiment, the operations to receive the original from the partner facsimile 17 as the user and to search it and to transmit the image data to the user will now be described hereinbelow with reference to a flowchart of FIG. 7.

First, in step S10, the CPU 9 is in the waiting mode of the end of reception data from the general communication interface (GC I/F) 12. On the other hand, when a terminating call is received from the partner facsimile 17 through the public telephone network 16, the GC I/F 12 receives the original through the adapter 13 in accordance with the standard facsimile protocol When an end of transmission signal is received from the partner facsimile, an end of reception signal is output to the CPU 9. In response to the end of reception signal, the CPU 9 detects the terminating call from the partner facsimile. By the terminating call, the waiting mode is released and the processing routine advances to step S12. Since the telephone number of the partner facsimile is used when the image data after the search is transmitted, it is stored in the GC I/F 12.

In the next step S12, the reception data is transmitted to the image memory (IMEM) 11 and the MBU 3 and MMR/RL 14 are made operative to expand the received data. In step S14, a check is made to see if the expansion of the received data has been finished or not. For instance, when the facsimile transmission and reception data is in the GIII mode, such an expanding process is executed because the data compressed by the MH method is transmitted and received. In the embodiment, the MMR/RL 14 executes the expansion and after completion of the expansion, an end of data expansion signal is output to the CPU 9. The expansion data developed in the image memory 11 corresponds to the foregoing transmission original shown in FIG. 6.

In the next step S16, the converter 21 is made operative and a check is made to see if the character recognition of the expansion data has been finished or not in step S18. On the other hand, the converter 21 checks to see if the tag 61 indicative of the character train data of the index information exists at a special location in the data shown in FIG. 6 or not. If the tag 61 is written, the subsequent data is recognized as the character. After the recognition with respect to the whole area of the image data was finished, an end of recognition signal is output to the CPU 9. In response to an end of conversion signal from the converter 21, in step S20, by using the character recognized by the converter 21 as the key word of the index information corresponding to the image, the data base of the index information existing on the hard disk 18 or in the program memory (ROM) 10 is searched and the address information in the optical disk 8 as the storage location of the image data corresponding to the index information is obtained. In the next step S22, the BMU 3 and MMR/RL 14 are made operative to transfer the image data on the optical disk 8 to the image memory 11 by the address information and to compress the image data. In step S24, a check is made to see if the compression has been finished or not. If YES, in step S26, the image data searched is transmitted to the partner facsimile. The telephone number of the partner facsimile has been stored in the GC I/F 12.

According to the embodiment, when the user at a remote location wants to obtain image data stored in the electronic file system, he can obtain the image data from the facsimile without needing any operator of the electronic file system. If a plurality of image information corresponding to the index information exist, the electronic file system can also transmit such a fact to the transmitting side. Or, the reduced information of a plurality of image information can be transmitted together with the index information to the transmitting side, thereby allowing the information to be further compressed. The reduced information can be made by thinning out the filed image information before transmission. Or, both of the original image and the reduced image may be also prepared in the file.

As described above, according to the invention, special pattern information in the reception information received from the partner facsimile is recognized and the result of the recognition is used as the index information and the image data file is searched. The searched image data can be transmitted to the partner facsimile.

What is claimed is:

1. An image processing apparatus comprising:
   recognizing means for recognizing special pattern information in reception image data;
   converting means for converting the result of the recognition by said recognizing means into index information corresponding to image information in said reception image data; and
   memory means for storing the index information converted by said converting means and said image information so as to correspond to one another.

2. An apparatus according to claim 1, wherein the image data is transmitted via facsimile.

3. An apparatus according to claim 1, wherein the special pattern information comprises a mark.

4. An apparatus according to claim 1, wherein the special pattern information comprises a bar code.

5. An apparatus according to claim 1, wherein said memory means comprises an optical disc.

6. An apparatus according to claim 1, wherein said memory means comprises a magneto-optical disc.

7. An apparatus according to claim 1, wherein the image data is received via a telephone network.

8. An apparatus according to claim 7, wherein said receiving means has an adaptor for connecting said apparatus to the telephone network.

9. An apparatus according to claim 1, wherein the special pattern information is located in a specified area in the image data.

10. An apparatus according to claim 9, wherein the image data includes an area mark defining the specified area.

11. An apparatus according to claim 10, wherein the area mark comprises tag information.

12. An apparatus according to claim 1, further comprising means for receiving the image data and means for expanding the image data received by said receiving means, wherein said recognizing means recognizes the image data expanded by said expansion means.

13. An apparatus according to claim 12, wherein said expansion means expands data compressed by the MH method.

14. An apparatus according to claim 12, further comprising means for storing the image data received by said receiving means.

15. An apparatus according to claim 1, further comprising means for receiving the image data and means for controlling said recognizing means, said converting means, said memory means and said receiving means.

16. An apparatus according to claim 15, further comprising means for transmitting data outside, wherein if the index information has been already stored in said memory means, said control means controls said transmitting means to transmit data indicating to that effect.

17. An apparatus according to claim 15, wherein said control means determines whether the image data is received by said receiving means.

18. An apparatus according to claim 15, wherein said control means determines whether reception of the image data by said receiving means has been completed.

19. An apparatus according to claim 18, wherein said receiving means receives image data transferred via a telephone network and wherein said control means disconnects said method from the telephone network in response to a determination whether the reception of the image data by said receiving means has been completed.

20. An apparatus according to claim 18, further comprising means for storing the image data received by said receiving means.

21. An apparatus according to claim 20, wherein said control means controls said memory means to store the image data received by said receiving means after determination whether the reception of the image data by said receiving means has been completed.

22. An apparatus according to claim 21, further comprising means for expanding the image data stored in said memory means.

23. An image processing apparatus comprising:
    recognizing means for recognizing special pattern information in reception information;
    searching means for searching an image data file by using the result of the recognition by said recognizing means as index information; and
    transmitting means for transmitting the image data which was searched by said searching means to a transmitting side.

24. An apparatus according to claim 23, wherein the information is received via facsimile.

25. An apparatus according to claim 23, wherein the special pattern information comprises a mark.

26. An apparatus according to claim 23, wherein the special pattern information comprises a bar code.

27. An apparatus according to claim 23, wherein said recognizing means includes character recognition means.

28. An apparatus according to claim 23, wherein the image data file comprises an optical disc.

29. An apparatus according to claim 23, wherein the image data file comprises a magneto-optical disc.

30. An apparatus according to claim 23, wherein the event that a plurality of the image data are searched by said searching means, said transmitting means transmits information to that effect to the transmission side.

31. An apparatus according to claim 23, wherein the image information was sent by the transmitting side.

32. An apparatus according to claim 23, wherein the image information is received via a telephone network.

33. An apparatus according to claim 32, wherein said receiving means has an adaptor for connecting said method to the telephone network.

34. An apparatus according to claim 23, wherein the special pattern information is located in a specified area in the image data.

35. An apparatus according to claim 34, wherein the image data includes an area mark defining the specified area.

36. An apparatus according to claim 35, wherein the area mark comprises tag information.

37. An apparatus according to claim 23, further comprising means for receiving the image information and means for expanding the image information received by said receiving means, wherein said recognizing means recognizes the image information expanded by said expansion means.

38. An apparatus according to claim 37, wherein said expansion means expands information compressed by the MH method.

39. An apparatus according to claim 37, further comprising means for storing the image information received by said receiving means.

40. An apparatus according to claim 23, further comprising means for receiving the image information.

41. An apparatus according to claim 40, wherein said receiving means includes memory means for storing a telephone number of a transmitting side which sent the image information.

42. An apparatus according to claim 41, wherein said transmitting means transmits the image data to a transmitting side specified by the telephone number stored in said telephone number memory means.

43. An apparatus according to claim 23, wherein in the event that a plurality of the image data are searched by said searching means, said transmitting means transmits the plurality of the image data to the transmission side.

44. An apparatus according to claim 43, wherein the plurality of the transmitted image data reduced in size.

45. An apparatus according to claim 44, wherein the reduced image data are stored in the image data file together with ordinary data.

46. An apparatus according to claim 23, further comprising means for receiving the image information and means for controlling said recognizing means, said searching means, said transmitting means and said receiving means.

47. An apparatus according to claim 46, wherein said control means determine whether the image information is received by said receiving means.

48. An apparatus according to claim 46, wherein said control means determines whether reception of the image information by said means has been completed.

49. An apparatus according to claim 48, wherein said receiving means receives image information transferred via a telephone network and wherein said control means disconnects said method from the telephone network in response to determination whether the reception of the image data by said receiving means has been completed.

50. An apparatus according to claim 48, further comprising means for storing the image information received by said receiving means.

51. An apparatus according to claim 50, wherein said control means controls said memory means to store the image information received by said receiving means after determination whether the reception for the image information by said receiving means has been completed.

52. An apparatus according to claim 51, further comprising means for expanding the image information stored in said memory means.

53. An image processing method comprising the steps of:
recognizing special pattern information in reception image data;
converting the result of the recognition into index information corresponding to image information in said reception image data; and
storing in memory the converted index information and the image information so as to correspond to one another.

54. A method according to claim 53, wherein the image data is transmitted via facsimile.

55. A method according to claim 23, wherein the special pattern information comprises a mark.

56. A method according to claim 23, wherein the special pattern information comprises a bar code.

57. A method according to claim 23, wherein said memory comprises an optical disc.

58. A method according to claim 23, wherein said memory comprises a magneto-optical disc.

59. A method according to claim 22, wherein the image data is received via a telephone network.

60. A method according to claim 59, wherein the image data is received via the telephone network through an adaptor.

61. A method according to claim 53, wherein the special pattern information is located in a specified area in the image data.

62. A method according to claim 61, wherein the image data includes an area mark defining the specified area.

63. A method according to claim 62, wherein the area mark comprises tag information.

64. A method according to claim 23, further comprising receiving the image data and expanding the image data received wherein the expanded image data is recognized.

65. A method according to claim 64, wherein said expansion means expands data compressed by the MH method.

66. A method according to claim 64, further comprising storing the received image data.

67. A method according to claim 53, further comprising receiving the image data and controlling the steps of recognizing, converting, storing and receiving.

68. A method according to claim 67, wherein said controlling determines whether the image data is received.

69. A method according to claim 67, further comprising transmitting data outside, wherein if the index information has been already stored in said memory, said controlling controls said transmitting to transmit data to that effect.

70. A method according to claim 67, wherein said controlling determines whether reception of the image data has been completed.

71. A method according to claim 70, wherein said received image data is transferred via a telephone network and wherein said controlling disconnects the telephone network in response to a determination whether the reception of the image data has been completed.

72. A method according to claim 70, further comprising storing the received image data.

73. A method according to claim 72, wherein said controlling controls said memory to store the received image data after a determination whether the reception of the image data has been completed.

74. A method according to claim 73, further comprising expanding the image data stored in said memory.

75. An image processing method comprising the steps of:
  recognizing special pattern information in reception information;
  searching an image data file by using the result of the recognition as index information; and
  transmitting the image data which was searched for to a transmitting side.

76. A method according to claim 75, wherein the information is received via facsimile.

77. A method according to claim 75, wherein the special pattern information comprises a mark.

78. A method according to claim 75, wherein the special pattern information comprises a bar code.

79. A method according to claim 75 wherein said recognizing includes character recognizing.

80. A method according to claim 75, wherein the image data file comprises an optical disc.

81. A method according to claim 75, wherein the image data file comprises a magneto-optical disc.

82. A method according to claim 75, wherein in the event that a plurality of the image data are searched, said transmitting transmits information to that effect to the transmission side.

83. A method according to claim 75, wherein the information was sent by the transmitting side.

84. A method according to claim 75, wherein the information is received via a telephone network.

85. A method according to claim 84, wherein said information is received via the telephone network through an adaptor.

86. A method according to claim 75, wherein the special pattern information is located in a specified area in the image data.

87. A method according to claim 86, wherein the image data includes an area mark defining the specified area.

88. A method according to claim 87, wherein the area mark comprises tag information.

89. A method according to claim 75, further comprising receiving the reception information and expanding the reception information, wherein said recognizing recognizes the reception image information expanded by said expansion means.

90. A method according to claim 89, wherein said expansion expands information compressed by the MH method.

91. A method according to claim 89, further comprising storing the reception information.

92. A method according to claim 75, further comprising receiving the information.

93. A method according to claim 92, wherein said receiving includes memory for storing a telephone number of a transmitting side which sent the information.

94. A method according to claim 93, wherein said transmitting transmits the data to a transmitting side specified by the telephone number stored in said telephone number memory means.

95. A method according to claim 75, wherein in the event that a plurality of the image data are searched, said transmitting transmits the plurality of the image data to the transmission side.

96. A method according to claim 93, wherein the plurality of the transmitted image data are reduced in size.

97. A method according to claim 96, wherein the reduced image data are stored in the image data file together with ordinary data.

98. A method according to claim 75, further comprising receiving the information and controlling said recognizing, said searching and said transmitting.

99. A method according to claim 98, wherein said controlling determines whether the information is received.

100. A method according to claim 98, wherein said controlling determines whether reception of the information has been completed.

101. A method according to claim 100, wherein said receiving receives information transferred via a telephone network and wherein said controlling disconnects the telephone network in response to a determination whether the reception of the information has been completed.

102. A method according to claim 101, further comprising storing the received information in memory.

103. A method according to claim 102, wherein said controlling controls said memory to store the image information received after determination whether the reception of the information has been completed.

104. A method according to claim 103, further comprising expanding the information stored in said memory.

* * * * *

UNITED STATES PATENT AND TRADEMARK OFFICE
CERTIFICATE OF CORRECTION

PATENT NO. : 5,084,769
DATED : January 28, 1992
INVENTOR(S) : KIYOTAKA MIURA

It is certified that error appears in the above-identified patent and that said Letters Patent is hereby corrected as shown below:

COLUMN 5

Line 46, "receiving" should read --recognizing--.

COLUMN 6

Line 17, "said method" should read --said receiving means--.
    Line 55, "wherein the" should read --wherein in the--.
    Line 65, "method" should read --apparatus--.

COLUMN 7

Line 45, "determine" should read --determines--.
    Line 49, "said means" should read --said receiving means--.
    Line 53, "method" should read --apparatus--.
    Line 63, "for" should read --of--.

COLUMN 8

Line 13, "claim 23," should read --claim 53,--.
    Line 15, "claim 23," should read --claim 53,--.
    Line 17, "claim 23," should read --claim 53,--.
    Line 19, "claim 23," should read --claim 53,--.
    Line 21, "claim 22," should read --claim 53,--.
    Line 34, "claim 23," should read --claim 53,--.

COLUMN 9

Line 18, "claim 75" should read --claim 75,--.

UNITED STATES PATENT AND TRADEMARK OFFICE
CERTIFICATE OF CORRECTION

PATENT NO. : 5,084,769
DATED : January 28, 1992
INVENTOR(S) : KIYOTAKA MIURA

It is certified that error appears in the above-identified patent and that said Letters Patent is hereby corrected as shown below:

COLUMN 10

Line 19, "claim 93," should read --claim 95,--.

Signed and Sealed this

Eighth Day of June, 1993

Attest:

MICHAEL K. KIRK

Attesting Officer

Acting Commissioner of Patents and Trademarks